(12) United States Patent
England et al.

(10) Patent No.: US 7,554,060 B2
(45) Date of Patent: Jun. 30, 2009

(54) DISPLAYING COOKING-RELATED INFORMATION

(76) Inventors: Raymond O. England, c/o Bose Corporation, The Mountain, Framingham, MA (US) 01701; Barret Lippey, c/o Bose Corporation, The Mountain, Framingham, MA (US) 01701; Deborah E. Rodgers, c/o Bose Corporation, The Mountain, Framingham, MA (US) 01701; Laura J. Schroeder, c/o Bose Corporation, The Mountain, Framingham, MA (US) 01701

( * ) Notice: Subject to any disclaimer, the term of this patent is extended or adjusted under 35 U.S.C. 154(b) by 69 days.

(21) Appl. No.: 11/537,341

(22) Filed: Sep. 29, 2006

(65) Prior Publication Data

US 2008/0099449 A1    May 1, 2008

(51) Int. Cl.
*H05B 1/02* (2006.01)
(52) U.S. Cl. .................. 219/480; 219/506; 219/487; 219/412; 374/130
(58) Field of Classification Search .............. 219/414, 219/412, 445.1, 487, 506, 502, 518; 374/141, 374/130; 99/451, 325
See application file for complete search history.

(56) References Cited

U.S. PATENT DOCUMENTS

| | | |
|---|---|---|
| 3,612,826 A | 10/1971 | Deaton |
| 3,736,861 A | 6/1973 | Kroyer et al. |
| 3,742,174 A | 6/1973 | Harnden, Jr. |
| 3,742,178 A | 6/1973 | Harnden, Jr. |
| 3,745,290 A | 7/1973 | Harnden, Jr. et al. |
| 3,777,094 A | 12/1973 | Peters, Jr. |
| 4,169,222 A | 9/1979 | Tucker |
| 4,617,441 A | 10/1986 | Koide et al. |
| 4,790,292 A | 12/1988 | Kuhn |
| 5,013,893 A | 5/1991 | Goessler et al. |
| 5,138,135 A | 8/1992 | Husslein et al. |
| 5,162,636 A | 11/1992 | Randolph, Jr. et al. |
| 5,383,295 A | 1/1995 | Strattman |
| 5,441,344 A * | 8/1995 | Cook, III ................ 374/141 |
| 5,448,036 A | 9/1995 | Husslein et al. |
| 5,499,597 A * | 3/1996 | Kronberg ................ 116/216 |
| 5,611,327 A | 3/1997 | Filho et al. |
| 5,746,119 A | 5/1998 | Matsumoto |
| 5,750,959 A * | 5/1998 | Plumptre ............... 219/445.1 |
| 5,809,680 A | 9/1998 | Scheidler et al. |
| 5,938,962 A * | 8/1999 | Adamski et al. ........... 219/502 |
| 5,977,522 A * | 11/1999 | Henrich et al. ......... 219/445.1 |

(Continued)

FOREIGN PATENT DOCUMENTS

DE    44 24 847    1/1996

(Continued)

OTHER PUBLICATIONS

International Search Report and Written Opinion dated Jul. 1, 2008 from International Application No. PCT/US2007/079977.

(Continued)

*Primary Examiner*—Mark H Paschall
(74) *Attorney, Agent, or Firm*—Bose Corporation (57) ABSTRACT

Among other things, light that carries information about cooking is directed in a first direction towards a redirection element and, at the redirection element, the light is redirected to be visible to a person cooking.

41 Claims, 8 Drawing Sheets

U.S. PATENT DOCUMENTS

| | | | |
|---|---|---|---|
| 5,981,916 | A | 11/1999 | Griffiths et al. |
| 6,028,521 | A | 2/2000 | Issachar |
| 6,051,821 | A | 4/2000 | Dahl et al. |
| 6,080,496 | A | 6/2000 | Hupf et al. |
| 6,104,007 | A | 8/2000 | Lerner |
| 6,111,228 | A | 8/2000 | Berkcan et al. |
| 6,118,105 | A | 9/2000 | Berkcan et al. |
| 6,121,587 | A | 9/2000 | Leiprecht et al. |
| 6,140,617 | A | 10/2000 | Berkcan et al. |
| 6,169,486 | B1 | 1/2001 | Berkcan et al. |
| 6,206,564 | B1 | 3/2001 | Adamczewski |
| 6,214,401 | B1 | 4/2001 | Chaput et al. |
| 6,246,033 | B1 | 6/2001 | Shah |
| 6,369,370 | B1 | 4/2002 | Eskildsen |
| 6,462,316 | B1 | 10/2002 | Berkcan et al. |
| 6,639,190 | B2 | 10/2003 | Lerner |
| 6,750,433 | B2 | 6/2004 | Guenther et al. |
| 6,765,179 | B2 | 7/2004 | Wilde et al. |
| 6,782,599 | B1 | 8/2004 | Sollo |
| 6,797,297 | B2 | 9/2004 | Schneider |
| 6,806,444 | B2 | 10/2004 | Lerner |
| 6,924,598 | B2 | 8/2005 | Strattman |
| 7,041,945 | B2 | 5/2006 | Aihara et al. |
| 7,087,865 | B2 | 8/2006 | Lerner |
| 2002/0009121 | A1 | 1/2002 | Siu |
| 2002/0189464 | A1 | 12/2002 | Schneider |
| 2003/0085222 | A1 | 5/2003 | Erdmann |
| 2003/0202558 | A1 | 10/2003 | Chung et al. |
| 2003/0209154 | A1 | 11/2003 | Park |
| 2004/0077187 | A1 | 4/2004 | Belongia et al. |
| 2004/0108311 | A1 | 6/2004 | de Rooij et al. |
| 2004/0159650 | A1 | 8/2004 | Steiner et al. |
| 2004/0217709 | A1 | 11/2004 | Strattman |
| 2004/0238044 | A1 | 12/2004 | Owen et al. |
| 2004/0238524 | A1 | 12/2004 | Lerner |
| 2005/0006379 | A1 | 1/2005 | Sullivan |
| 2005/0194375 | A1 | 9/2005 | McWilliams |
| 2005/0208272 | A1 | 9/2005 | Groll |
| 2006/0081602 | A1* | 4/2006 | Lerner .................... 219/445.1 |

FOREIGN PATENT DOCUMENTS

| | | |
|---|---|---|
| EP | 0 162 645 | 11/1985 |
| EP | 0 359 028 | 3/1990 |
| EP | 0 437 826 | 7/1991 |
| EP | 0 438 656 | 7/1991 |
| EP | 0 499 972 | 8/1992 |
| EP | 0 540 876 | 5/1993 |
| EP | 1 054 609 | 10/2003 |
| GB | 1 346 574 | 2/1974 |
| GB | 2 381 585 | 5/2003 |
| JP | 03099125 | 4/1991 |
| JP | 2004095316 | 3/2004 |
| WO | 89/05112 | 6/1989 |
| WO | 01/93640 | 12/2001 |

OTHER PUBLICATIONS

International Preliminary Report on Patentability dated Nov. 21, 2008, issued in International Application No. PCT/US2007/079977.

National KZ-VSW33D Beginning Induction Heating Stove User Manual Book; Matsushita Electric Industrial Co., Ltd., Kobe City, Japan, 2007; Japanese without Translation. (Best known English language equivalent appears to be KY-H30AP Operating Instructions, listed below.).

http://theinductionsite.com/PHP/not-sold.php?id=KYH30A &title=Panasonic+KY-H30A. Retrieved from the Internet Feb. 20, 2009.

http://theinductionsite.com/PHP/not-sold.php?id=KYH30A &title=Panasonic+KY-30A. Retrieved from the Internet Feb. 20, 2009.

http://www.galtak.com/kyh30ap.html. Retrieved from the Internet Feb. 20, 2009.

http://www.panasonic.ca/english/appliance/kitchen/cooktop/features.asp. Retrieved from the Internet Feb. 20, 2009.

http://www.panasonic.ca/english/appliance/kitchen/cooktop/ky-h30a.asp. Retrieved from the Internet Feb. 20, 2009.

Panasonic Installation Instructions, Induction Heating Cooktop (built-in type), KY-H30AP, Matsushita Electric Industrial Co., Ltd., Feb. 2006.

Panasonic Operating Instructions, Induction Heating Cooktop (built-in type), KY-H30AP, Matsushita Electric Industrial Co., Ltd., Feb. 2006.

* cited by examiner

DISPLAYING COOKING-RELATED INFORMATION

TECHNICAL FIELD

This description relates to displaying cooking-related information.

BACKGROUND

Electric resistance or induction heating elements used on cooktops do not always provide visual sues to a user about how hot the elements, cookware, or food may be. On some cooktops, status information about cooking is provided implicitly by the controls used to regulate the heating elements or explicitly by displays related to the controls. United States patent application US0024/0238524A1 proposes to warn users when an element is hot using LEDs arranged under the cooktop.

SUMMARY

In general, in an aspect, light that carried information about cooking is directed in a first direction towards a redirection element, at the redirection element, light is redirected to be visible to a person cooking.

Implementations may include one or more of the following features. The information is represented by a color of the light, or by a pattern, an image, a character, or a symbol. The information is modulated by turning the light on and off, light color, and/or light intensity. The light is directed along the first direction through a material which transmits the entire or only a portion of the visible light spectrum. The redirection element comprises a light dispersing element. The light dispersing element comprises laser marked or grit blasted features. The first direction comprises a controlled incoming angle. The information comprises one or more of the following: an on-and-off status, temperature, a temperature distribution, a rate of temperature change, a rate of power change, a desired target temperature, a presence of food, the existence of an usage temperature. The light is delivered from a light emitting diode (LED) and/or a plasma lamp. The light is viewed as emitting from the vicinity of a heating element. The redirection element is in the vicinity of a heating element. The vicinity is directly over the heating element. The light is not located within a cooktop. The light is directed from openings of a light enclosure. The interior of the light enclosure is coated with a Lambertian light reflector. The cooktop surfaces may be coated with a Lambertian light reflector. The cooktop surfaces may be coated with an optically absorptive coating. The redirection element is located within and/or on the surface of a cooktop. The information is displayed by one or more internal redirection elements and/or one or more surface redirection elements. The heating element comprises an induction coil (or any other heating method).

In general, in an aspect, a cooktop comprises a material which transmits some portion or the entire visible light spectrum, and a light redirecting element in the material. The light redirecting element receives light from a light source located outside the cooktop.

Implementations may include one or more of the following. The light source introduces light into a light enclosure with openings; the light redirecting element receives light escaping from the openings. The interior of the light enclosure is coated with a Lambertian light reflector. The edges of the cooktop are coated with a Lambertian light reflector. The bottom surface of the cooktop is coated with an optically absorptive coating.

In general, in an aspect, an apparatus comprises a cooktop and a plasma lamp to provide light visible at an exposed surface to a person cooking.

Implementations may include one or more of the following. The apparatus further includes an induction heating element. The plasma lamp is over the induction heating element. The plasma lamp comprises a grounded electrode. The plasma lamp is illuminated depends on an induction heated cookware's size. The plasma lamp comprises a multiplicity of concentric annuli of light emitting zones. The light is modulated to display the information. The light modulation is a variation in color. The plasma lamp comprises a multiplicity of phosphor layers with different emitted colors.

In general, in an aspect, information is determined about a changing state of cooking begin done on a cooking surface, and light that has a characteristic that changes based on the changing state of cooking being done, is made visible to a user in the vicinity of the cooking surface.

These and other aspects and features and combinations of them may be expressed as methods, apparatus, systems, program products, in "means for" terminology, and in other ways.

Other advantages will be apparent from the description and from the claims.

DESCRIPTION

Figure 1:
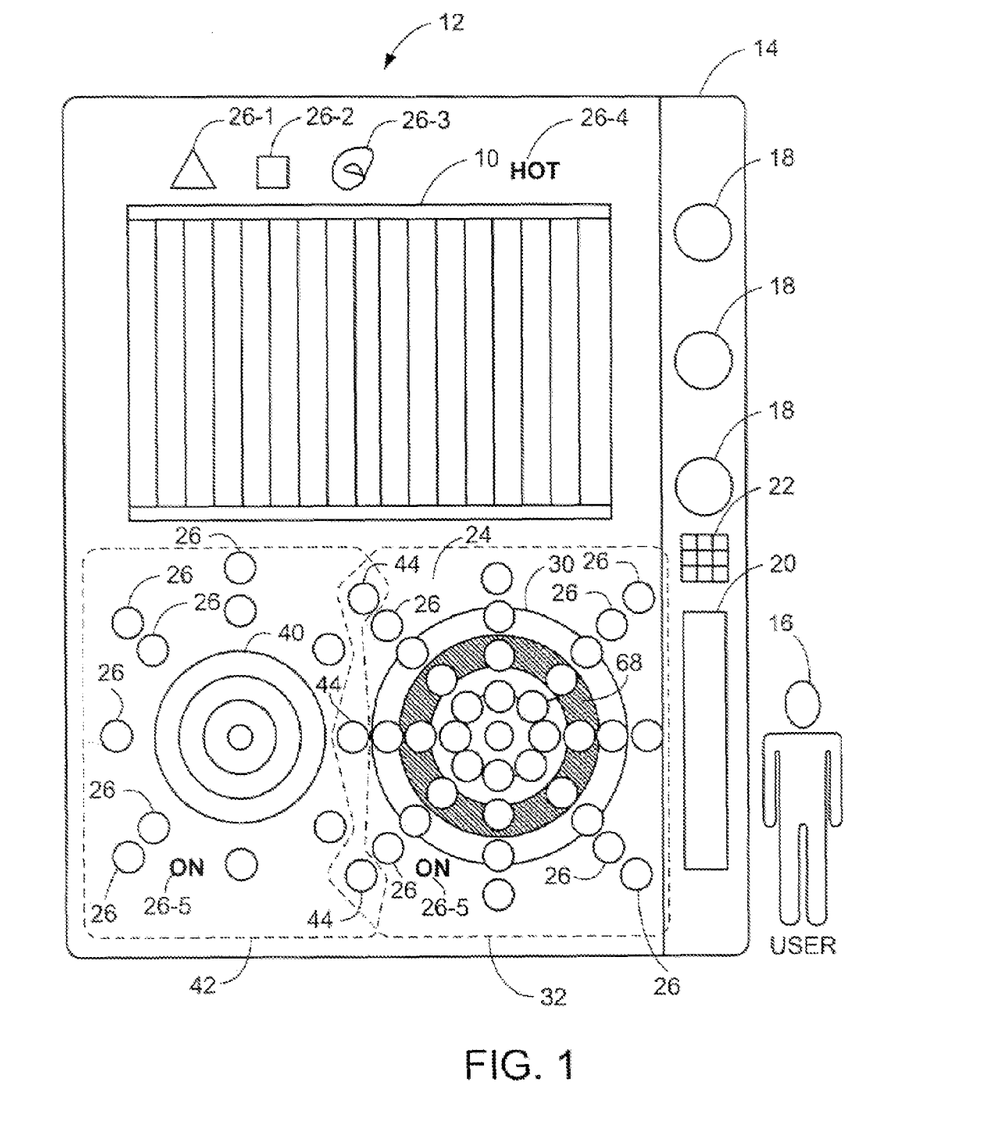
FIG. 1 is a top view of a cooktop.

Referring to FIG. 1, in some examples, visual cues about cooking information related to use of a heating (induction heating, electric heating, or other heating methods) element 10, 30 or 40 of a cooktop 12 (or other cooking appliance) can be displayed in a way that enables a user 16 to quickly, accurately, and intuitively understood the state of, for example, the heating element 10, 30 or 40, the cooktop 12, a cooking utensil, or the food being cooked, and decide how to proceed, for example, by turning on a heating element 10, 30 or 40 or keeping clear of a heating element 10, 30 or 40 that is hot enough to burn.

One portion of the cooktop 12, a control area 14, conveys certain kinds of cooking related information to a user 16. Located in the control area 14, control knobs 18, control panel displays 20, and control buttons 22 display the status of the cooktop 12. For example, when a heating element 10, 30 or 40 of the cooktop 12 has been turned on by turning on a control knob 18, the position of the control knob 18 indicates something about the cooktop's status.

In the example shown in FIG. 1, another portion of the cooktop 12, a cooktop heating area 24, also conveys cooking-related information to the user 16. Lighting elements 26, which emit or redirect lights, located in the heating area 24 provide information that may be more easily and intuitively seen and understood than information provided in the control area 14. Light emitted from or redirected by the lighting elements 26 is visible to a user 16 standing near the cooktop 12. In some examples, the light may also be visible to users 16 standing in other locations farther away from the cooktop 12. In some examples, the lighting elements 26 are illuminated by a light source indirectly from the side, above, or below the cooktop. In some examples, the lighting elements emit light from a light source such as a plasma lamp.

In some examples, multiple lighting elements 26 are arranged at and near each of the heating elements 10, 30 or 40 to ensure at least a portion of the lighting elements 26 remain visible to the user 16 when a pot or other cookware (not shown) is placed on the heating element 10, 30 or 40, even though some of the lighting elements 26 may be blocked.

In some examples, lighting elements 26 are discrete elements, one or more or a pattern or group of the lighting elements 26 are associated with specific one or more of the heating elements 10, 30 or 40 and convey cooking-related information for the associated heating element or elements 10, 30 or 40. Conversely, each of the heating elements 10, 30 or 40 can be associated with one or more patterns or groups of the lighting elements 26.

For example, in FIG. 1, heating element 30 is associated with a group 32 of lighting elements 26. Cooking-related information conveyed by the lighting elements of group 32 pertains (at least on some occasions) to heating element 30. Heating element 40 is associated with a group 42 of lighting elements 26. Some dual role lighting elements 44 can be associated with both heating element 30 and heating element 40. For example, when the dual role lighting elements 44 are conveying cooking-related information associated with heating elements 30 by being lit in red to indicate that heating element 30 has been turned on, the lighting elements 44 will also be lit in red.

In the examples of FIG. 1, the groups 32 of lighting elements 26 are in groups and patterns (in radial lines) around the associated heating element 30. In some examples, the lighting elements 26 can be arranged in any other kind of pattern or group. The arrangements of the lighting elements 26 in groups and patterns may be designed to serve the purpose of conveying cooking-related information by, for example, placement intended to maximize visibility.

The lighting elements 26 can be arranged in a wide variety of shapes and configurations, for example, radially (32) as shown in FIG. 1. The lighting elements 26 can be arranged around the heating element in patterns of varying densities (both densely and sparsely). The lighting elements 26 need not be circular. The lighting elements 26 are not limited to discrete geometrics such as 32 and 42. The lighting elements 26 can be continuous geometrics. They can be square, triangular, or any standard or nonstandard shape including alphanumeric characters, icons, symbols, words and designs such as 26-1 to 26-5 in FIG. 1. The lighting elements 26 may be arranged in an annular ring (or other shaped) area.

Arrangements may be chosen to serve aesthetic purposes. For example, in the patterns of lighting elements 26 in FIG. 1, some lighting elements 26 will remain visible to the user 16 even when some of them are obstructed by pots of different diameters. The arrangement also serves an aesthetic purpose because some users 16 find radial arrangements of light attractive. Other patterns (discrete or continuous) that may be useful include arrays, cluster, lines, circles, other geometric groupings, and random groupings. In some arrangements, the lighting elements 26 need not be in the same location as the heating element with which they are associated.

A wide variety of properties of the light emitted from or redirected by the lighting elements 26 (in fact, any light property that is perceivable by a user) can be used to encode and convey cooking-related information. The light properties may include individual colors (e.g., wavelengths), sequences of or time changing patterns of colors, ranges or groups of colors, intensities, sequences of intensities, ranges or groups of intensities, and other modulations. The different light properties may be applied to all of the lighting elements of a group or pattern, or only to some of them, or only to one at a time.

For example, a bright light or a rapidly flashing light can signify a very hot heating element 10, 30 or 40 or pot and a dim light or a non-flashing light can signify a cooler cooktop 12. A green light can signify that the cooktop is set to a high power-level whereas a blue appearing light can signify low power level.

A wide variety of cooking-related information can be conveyed using the lighting elements 26 and groups and patterns of them. The cooking related information could include status information about elements of the cooktop 12, including about the cooktop 12 as a whole, one or more of the heating elements, one or more pots or other items of cookware that are on one or more of the heating elements, the food that is being prepared in one or more of the items of cookware, and other information. Status information may include a power level of a heating element 10, 30 or 40, a temperature of a heating element 10, 30 or 40 when the heating element gets hot, a desired or intended temperature of a heating element 10, 30 or 40, a temperature distribution of the heating element 10, 30 or 40, a rate of change of temperature of a heating element, a temperature of a pot or other cookware, a desired or intended temperature of a pot or other cookware, a rat of change of temperature of a pot or other cookware, an elapsed time (count-up timer), a remaining time (count-down timer), a presence of food in one or more pots or other cookware, and a current measurement of mass of food in one or more of the pots or other cookware. This cooking-related information can enhance the user's cooking experience and safety. For example, knowing the heating rat of the cookware can help a chef produce more appetizing food. Knowing the time elapsed (or time remaining) since the heating element 10, 30 or 40 has been turned on or has reached a desired temperature can assist a busy cook by tracking the time remaining for a dish. Knowing the temperature of the pot can reduce the chance of the user 16 (or the food) being burned. When more than one item of food is being cooked on more than one heating element, the lighting elements 26 can be used to guide the user 16 with respect to the order in which different pots or cookware need attention. The cooking-related information could indicate the stage of cooking with respect to the steps of a recipe.

A wide variety of techniques and device can be used to provide the lighting elements 26. In some examples, the lighting elements 26 are illuminated by a light source indirectly from the side, above, or below the cooktop. In some examples, the lighting elements 26 are one or more plasma lamps.

Figure 2:
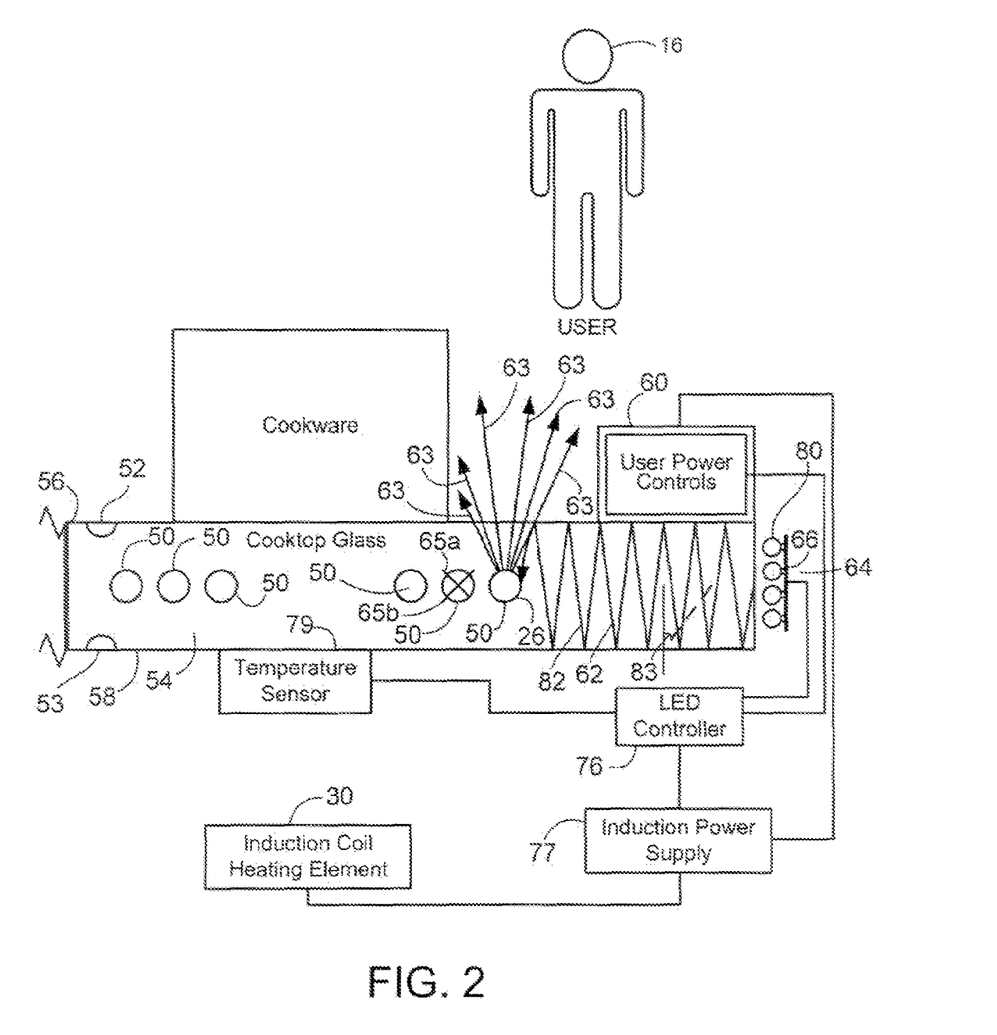
FIGS. 2, 5, 6, and 8 are schematic side views of cooktops.

In some examples, as shown in FIG. 2, the lighting elements 26 are light redirecting elements, which may be discrete or continuous, arranged to show certain features or patterns 50 within or on a surface (either the top 52 or bottom 53 surfaces) of a glass layer 54 that forms part of the cooktop. When the features 50 are within the glass 54, they may be located at any distance from the top or bottom planes 56, 58 of the glass layer, for example at approximately the midplane of the glass thickness. In the example of FIG. 2, the light is delivered to the features 50 from a side 64 of the cooktop.

As mentioned earlier, the features 50 can be discrete or continuous and can take on any of a wide variety of forms and shapes, including spheres, teardrops, cubes or concentric rings, squares, radially configured circles or rectangles, or lines. The features 50 can be either directly under (for internal features), or on (for surface features) the surface of the cooktop, and be placed in close proximity to a heating element 10, 30 or 40 so that the cooking-related information for the heating element 10, 30 or 40 can be displayed.

The glass layer 54 can be made of glass ceramic material similar to that often used in cooktop 12 which has good resistance to high temperatures, thermal cycling and high fracture resistance. In general, as a glass, glass ceramics have composition $Li_2O$—$Al_2O_3$—$SiO_2$ an other phases in very small percentage additions which are used as nucleating agents. Some examples of nucleating agents are $TiO_2$, $ZrO_2$ and $P_2O_5$ Nucleating agents enable the desirable properties of the glass ceramic to be achieved. Some trade names for glass ceramics which may be used for cooktop applications are EuroKera, Neoceram, Robax and Ceran.

The cooktop features can be achieved by laser marking, chemical etching, plasma etching, grit blasting, or in other ways. In addition, the glass 54 can be formed originally to have light dispersing features on its surfaces or internally.

When light from a light source 66 (for example, LEDs or conventional lamps) shines onto the internal or external features or other redirecting lighting elements, the redirecting lighting elements such as the internal features 50 or surfaces features 52 or 53, redirect the light to give the appearance that the lighting elements 26 themselves are emitting light 63. Visually attractive displays may be achieved by the arrangement of the redirecting lighting elements 26. The redirecting lighting element 26 (the internal or surface features) can then be used to emit a light signal for conveying information about cooking. For example, referring again to FIG. 1, when light is redirected by internal or surface features 26-5 to display the characters "ON", the user 16 will read the work "ON" as it is being projected from the internal or surface features.

Referring again to FIG. 1, in the case of induction heating element, for example, 30, the lighting elements 26 can be arranged directly above an induction coil (heating element 30) between the induction coil 58 and the portion of the cooktop which bears the pot or cookware. An induction coil 68 uses induction heating to heat food. Typically, a ferromagnetic (or ferromagnetic-coated) pot is placed above the induction coil 68. An induction current in the induction coil produces a rapidly oscillating magnetic field near the surface of the cooktop 12. The oscillating magnetic field is converted into heat in the ferromagnetic pot. Magnetic hysteresis enhances the heating effect for ferromagnetic materials. The magnetic field also produced electrical eddy currents in the metal base of the pot to produce resistive heating.

In some examples, the LEDs as light source are placed to the side 64 away from the induction heating element 30. This arrangement avoids potential damages from heat and the oscillating magnetic field which may affect the LED circuitry and causes LEDs to flicker. Furthermore, LEDs can be maintained and replaced more easily.

As shown in FIG. 2, a control system for controlling the light 63 that is redirected by the lighting elements 26 accepts information regarding the user's actions from the user power controls 60. Based on this and possibly other information (for example information about induction coil power, cooktop/pan/food temperature, intended recipes, maximum permissible cooking times, other foods being cooked on other elements), the control system coordinates the illumination of the lighting elements 26 (features 50) over time. Through the controlled illumination, information about cooking is conveyed to the user.

For example, to boil a pot of water on induction heating element 30, the user turns on the heating element 30 using the user power controls 60. The user's action is sent to an LED controller 76 and to an induction power supply 77. The induction power supply 77 delivers a corresponding amount of power to the induction heating element 30 to heat the water in the cookware.

The induction power supply 77 also sends a signal to the LED controller 76 which incorporates this information in its control of the light source 66. As the cookware is heated, the temperature of the cooktop is detected by one or more nearby temperature sensor 79 and the temperature of the pot is inferred from the temperature of the cooktop. The temperature may also be directly sensed within the cookware, or derived from the applied system load or other characteristic properties of the coil/target system. It should be noted that other sensors for providing other cooking information such as presence of food can also be used. The temperature sensor 79 sends a temperature signal to the LED controller 76. The LED controller 76, based on cooking information signals from the user power controls 60, power supply information from the induction power supply 77, and temperature information from the temperature sensor 79, generates and sends LED control signals to the lighting source 66. Light 62 from the light source 66 illuminates one or more lighting elements 26 based on the LED control signal. The lighting elements 26 redirect light 63 (such as through scattering) from the light source 66 and convey information to the user 16. The light source 66 may be standalone LEDs or LED arrays 80.

Although FIG. 2 shows the light 62 from the LEDs 80 projected from the side 64 of the cooktop, the light can also be projected from below or above the cooktop.

In some embodiments, the light 62 can be delivered to the cooktop through light pipes, fiber optic cables, mirrors, and other optical elements.

Light 62 from the light source 66 travels through the cooktop glass 54 to the lighting elements 26 by internal reflection 82. To achieve this, the angle 83 of the light from the light source 66 entering the glass cooktop 54 from the side 64 is controlled. For internal features 50, the incoming angle 83 of the light leads to total internal reflection (TIR) of the LED light 62. For surface features 52 the incoming angle 83 of the light can be set to the critical angle relative to the top surface 56 of the glass cooktop 54 to lead to development of a cooktop surface light ray traveling on the top surface 56 of the cooktop. For surface features 53 the incoming angle 83 of the light can be set to the critical angle relative to the bottom surface 58 of the glass cooktop 54 to lead to development of a cooktop surface light ray traveling on the bottom surface 58 of the cooktop. Surface features 52, 53 could also be illuminated from an indirect source located below the cooktop (see below for more details). In some examples, both internal features and surface features are employed for conveying cooking information. For example, internal features 50 can be used to indicate power on and variant power (by variable intensity), and surface features 52 and/or 53 can be used to indicate temperature variation. Internal features 50 and surface features 52 or 53 can be in different colors and/or patterns.

As in an optical fiber, a portion of the light 62 from the light source stays within the transmission medium (the cooktop glass 54). As measured between the light ray 62 and the perpendicular vector to the cooktop glass surface, if the angle of incidence 83 from the light source 66 is larger than the critical angle, the light 62 is internally reflected within the cooktop glass 65. Achieving an incident angle greater than the critical angle insures that the maximum amount of light is imparted to the glass, thus allowing the maximum amount of light to be available for redirection by the lighting elements. Light 62 traveling within the glass 54, is largely inconspicuous to the user until it encounters the lighting elements 26, which redirect the light 62. In this case, the features 50 effectively scatter the light in a conspicuous manner. Because light traveling within the glass is only evident at the features 50, the light 63 appears to the user 16 to origins from these features 50.

The critical angle is based on the index of refraction of the glass and of the air using Snell's Law. Any material that is optically transmissive and can withstand the cooking environment is a suitable candidate as a cooktop substrate. When the light travels in a glass ceramic cooktop 54, as the glass ceramic material has a general transmission of 90% in the visible spectrum, the light travels mostly unimpaired through the cooktop 54 until it hits the features 50.

A wide variety of light characteristics can be varied to convey a variety of information can be conveyed to the user. In some examples, the light source 66 can emit light 62 in selected wavelengths and polarities. The light source 66 may be different colored LEDs angled at different directions. The features 50 may be designed to act differently with respect to different polarization states of light, and thus light elements of different polarization states can occupy the same position on the cooktop surface.

The features 50 can be designed to redirect the light 62 from the light source 66 in a variety of different ways. For example, the light 62 can be redirected in a specific number of specific directions or it can be scattered and diffused indiscriminately. The light 62 can be redirected by features within the glass 54 (Or on the glass) that are arranged in places 65*a*, 65*b* as the light reflects from the different planes 65*a*, and 65*b*. These planes can be arranged to impart aesthetic or informational features to the redirected light. In the case in which the light 62 is redirected by indiscriminating scattering, the features are not arranged in any specific plane 65*a* or 65*b*. Rather, the features scatter light to create a fuzzy-looking glow.

An advantage of using features 50 within or on the glass is that the features 50 can be placed near areas of intense heat without fear of damage as they are an integral constituent of the glass itself. This permits placement of the lighting elements in places that would not be suitable for light sources 66. For example, LEDs do not have the thermal stability to be placed near open gas flames or electric heating coils The redirecting light elements 26 also permit easy replacing or switching of the light sources 66 that serve them. Among other things, the light sources 65 can be placed in an easily accessible area to enable the user 16 to change the light sources 66 (e.g., to replace a burnt-out light source, change the color, or upgrade to a more energy efficient source). In addition, if the supporting cooktop 54 is damaged, the supporting cooktop 54 can be replaced independently of the light source 66. The user may change the supporting cooktop 54 for other reasons, for example, to change the features 50 for aesthetic purposes. Because the lighting elements 26 are separate from the light sources 66, manufacturers can produce different models of cooktops that use a common set of lighting sources while changing the features from model to model to serve a variety of different purposes.

Figure 3:
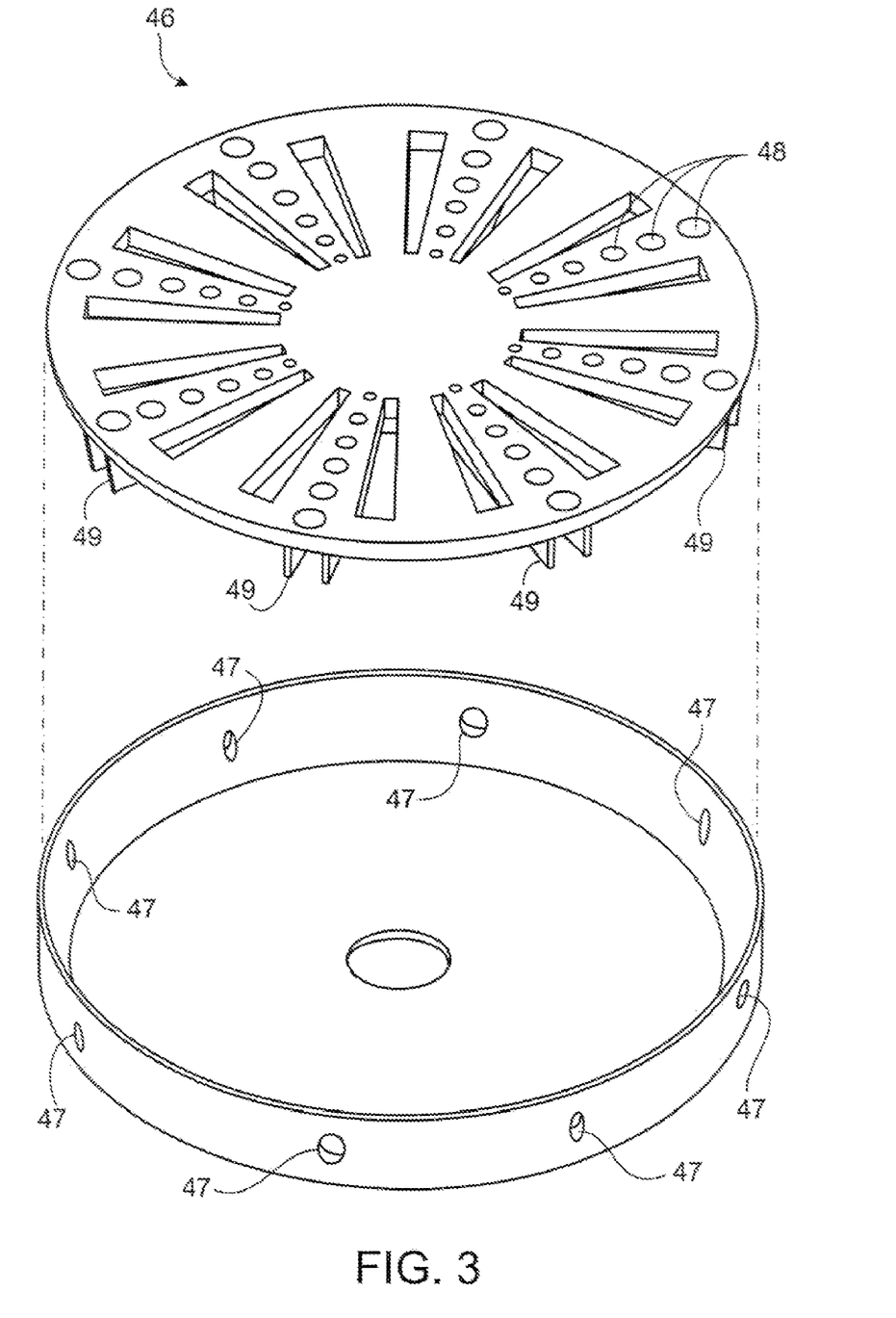
FIG. 3 is an example of a light enclosure

In some examples as shown in FIG. 3, light is captured within a geometric form light enclosure 46 which is designed for having total internally reflected light. The light will be let out only at openings 48 which have been designed to achieve maximum lighting elements (e.g., features 50, 52 or 53 of FIG. 2) illumination. In some examples, the light enclosure 46 can be placed between a heating element, such as an induction heating element 30, and cooktop glass. The interior surfaces of the light enclosure 46 can be coated with a material to produce a Lambertian light reflection to ensure that light only escapes at the desired location and with maximum intensity. The openings may be in the form of slits, slots, circles, triangle, wedges, squares, or any other geometry. Light from light source such as LEDs, fiber optic bundles, or conventional light sources can be introduced into the geometric form light enclosure 46 along its outer circumferential wall through openings 47. These light sources can be arranged at an angle to achieve maximum light intensity at the exit ports. Further, multiple light colors can be contained and redirected toward features (50, 52 or 53 of FIG. 2) by using internal dividers 49 within the closed light enclosure 46. This allows a distinct colors to be independently displayed on the cooktop surface simultaneously.

Figure 4A:
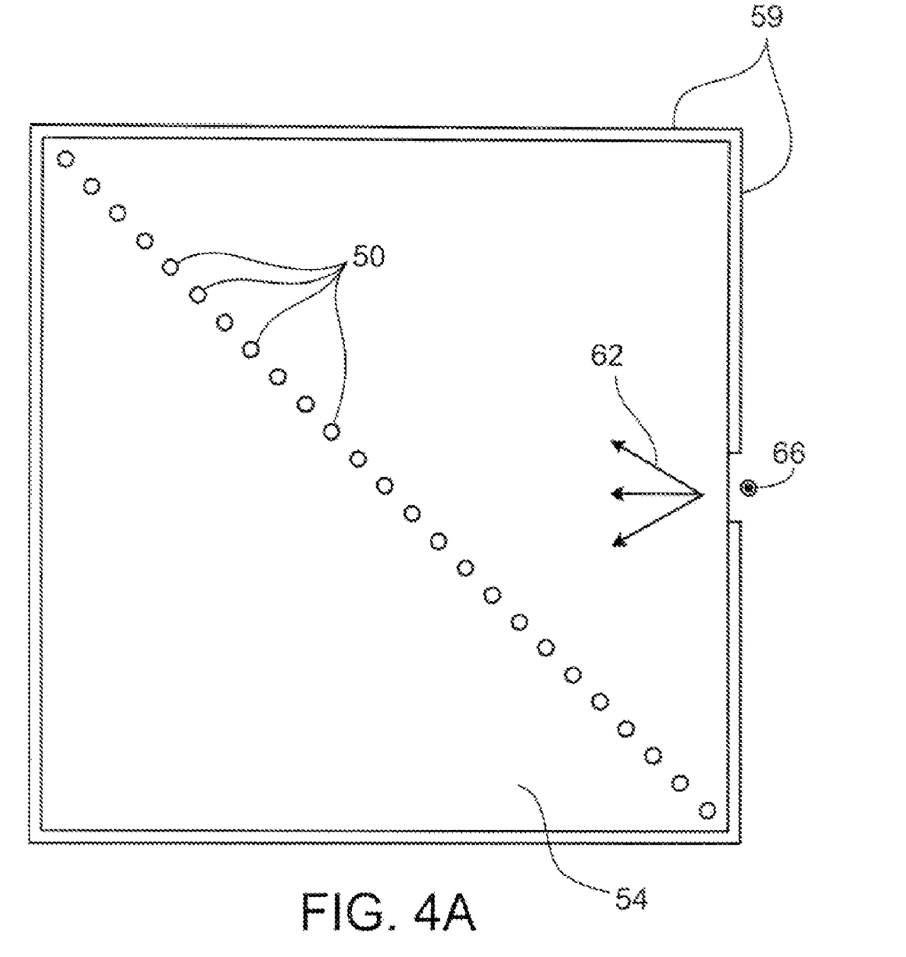
FIG. 4A is a plan view of cooktop with reflective coated sides
Figure 4B:
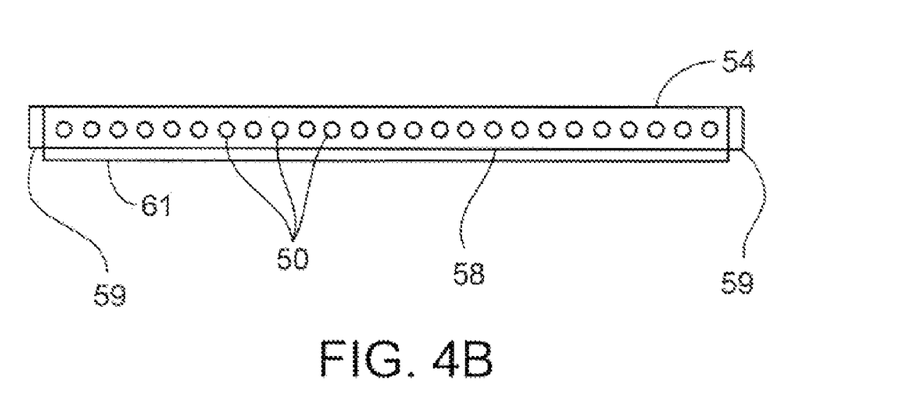
FIG. 4B is a cross section view of cooktop with reflective coated sides

In some examples as shown in FIGS. 4A and 4B, the top view and cross section view of the sides of the cooktop glass 54 which is coated with a Lambertian light reflector 59 to prevent light from escaping at the edges, and to provide a more uniform and more intense illumination of the features 50. The edge where the light is initially imparted to the cooktop glass can also be coated with the reflective coating to leave only the areas where light enters the glass uncoated. This will assure that the great majority of the light is trapped within the cooktop glass and is available for features 50 maximum illumination.

In some examples, as shown in FIGS. 4A and 4B, the bottom surface 58 of the cooktop glass 54 is coated with an optically absorptive coating 61 such as a black paint. This assures that any light which is refracted out of the glass ceramic at its bottom surface will be absorbed and thus not produce a diffuse reflection. As needed, areas of the bottom of the glass ceramic cooktop can be masked so as to allow light to escape from the light volume.

Figure 5:
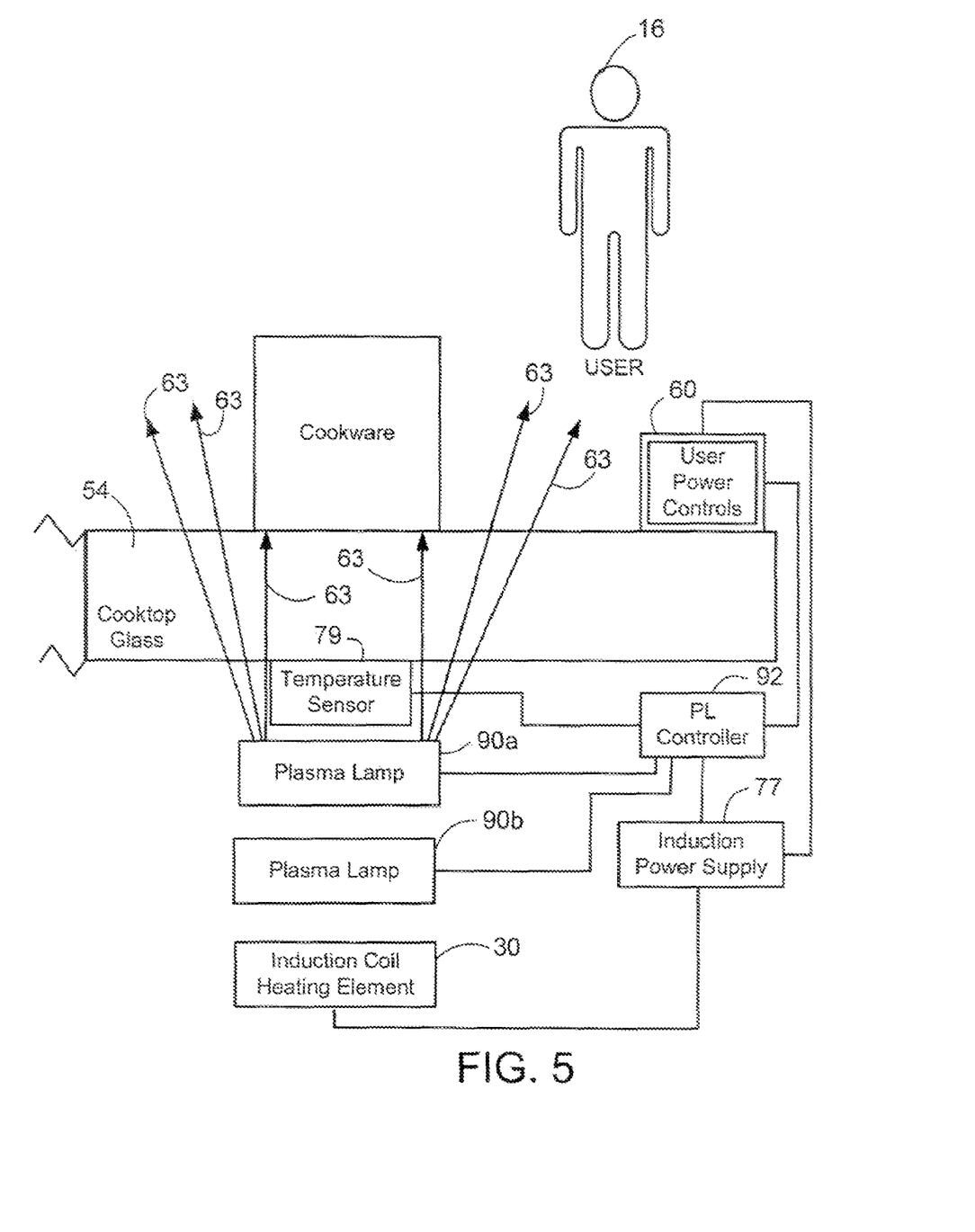

In some implementations, the light source 66 may be one or more plasma lamps 90*a*, 90*b* (collectively 90). Referring to FIG. 5, a plasma lamp (PL) controller 92 accepts information from the user power control 60, the induction power supply 77, and temperature sensor 79. Based on this and possibly other information, the controller 92 coordinates how and when a plasma lamp 90 is illuminated. The controlled illumination conveys information about cooking to the user 16.

The plasma lamp 90 can be built into a cooktop 54, (e.g., an induction cooktop) so that a flickering or moving glow appears under or in the vicinity of the pot or other cookware being heated. Although induction heating is invisible the plasma glow from the lamp 90 located under the pot can be used to simulate heating by another type of heat, for example, a gas flame. One type of plasma lamp that can be used is described in U.S. Pat. No. 5,383,295.

The cooing-related information provided to a user 16 of the cooktop using the plasma light 90 could include the amount of heating power applied by the induction power supply based on a color and/or intensity of the plasma light 90. A change in the amount of power being supplied could be indicated by a change in the color or intensity of the plasma light 90. In some embodiments, the relationship between the colors and power levels can follow a blackbody curve (red=low, yellow=medium, white=medium high, and blue=high). Other color-to-power level relationships may be selected based on psychological associations of various colors with information, for example blue=low and orange or red=high.

By adjusting the parameters of the plasma discharge or using diffusers, the plasma can appear warm and fuzzy rather than as a dangerous-looking lightning or sparing effect. The plasma lamp 90 contains gases and phosphors in the plasma discharge region. The colors can be produced by changing these gases and/or phosphors. The position of the plasma generation can also be controlled through modifying electrode geometries.

Power for the plasma stimulation can be from a separate power supply or from an existing power supply. If a separate power supply is used, a conventional high-voltage, high frequency power supply may power the plasma lamp. If an existing power supply used, the existing induction power supply 77 can be modified to produce high frequency components so that an additional power supply is not necessary.

Figure 6:
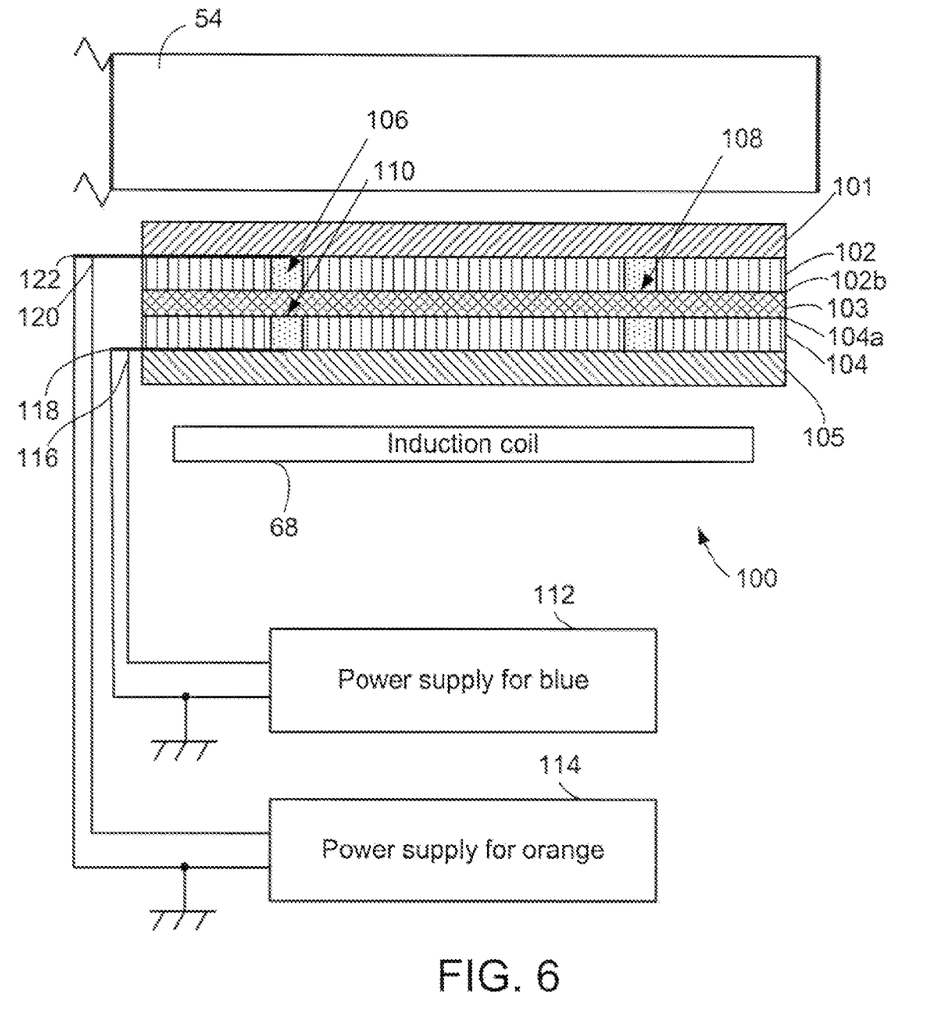

Referring to FIG. 6, in some embodiments, a plasma lighting system 100 can be designed to use two phosphors by applying each phosphor to opposite sides 102b, 104a of a glass plate 103. Plasma lamp is a sandwiching of five glasses: a top glass 101, a top spacer glass 102, a middle glass 103, a bottom space glass 104, and a bottom glass 105. A cavity 106 is formed by the middle glass 103, a spacer glass 102, 104, and either the top 101 or bottom 105 glasses. Xenon gas fills the cavity 106 and various combinations of phosphor line a portion of the cavity's walls.

In some examples, orange phosphor lines a portion 108 of the cavity 106 formed by the top side of the middle glass 102b and blue phosphor lines a portion 110 of the cavity 106 formed by the bottom side of the middle glass 104a. Each side is energized separately by a low frequency power supply (typically 60 Hz) 112, 114. The low frequency prevents the electricity from energizing the opposite side. By continuously varying the electrical stimulation of each side, a full range of colors is produced that varies from blue to orange. The intermediate colors include shade of magenta. The intensity of the light (brightness) can also vary at the same time the color goes from blue to orange. For example, the intensity may gradually increase during the blue to orange transition. In come embodiments, the blue phosphor is placed on the side opposite the view, the bottom side of the middle glass 104a, because the blue is brighter than the orange.

To avoid electrically charging the cookware and giving the user a shock or tingling sensation when the user that touches the pot, the plasma could be adequately grounded to remove the electrical charge. Referring to FIG. 6, in some embodiments, electrodes 116, 118, 120, 122 are included in plasma light were electrodes 118, 122 are grounded. This effectively prevents electrical charges from being induced in the pot.

Figure 7:
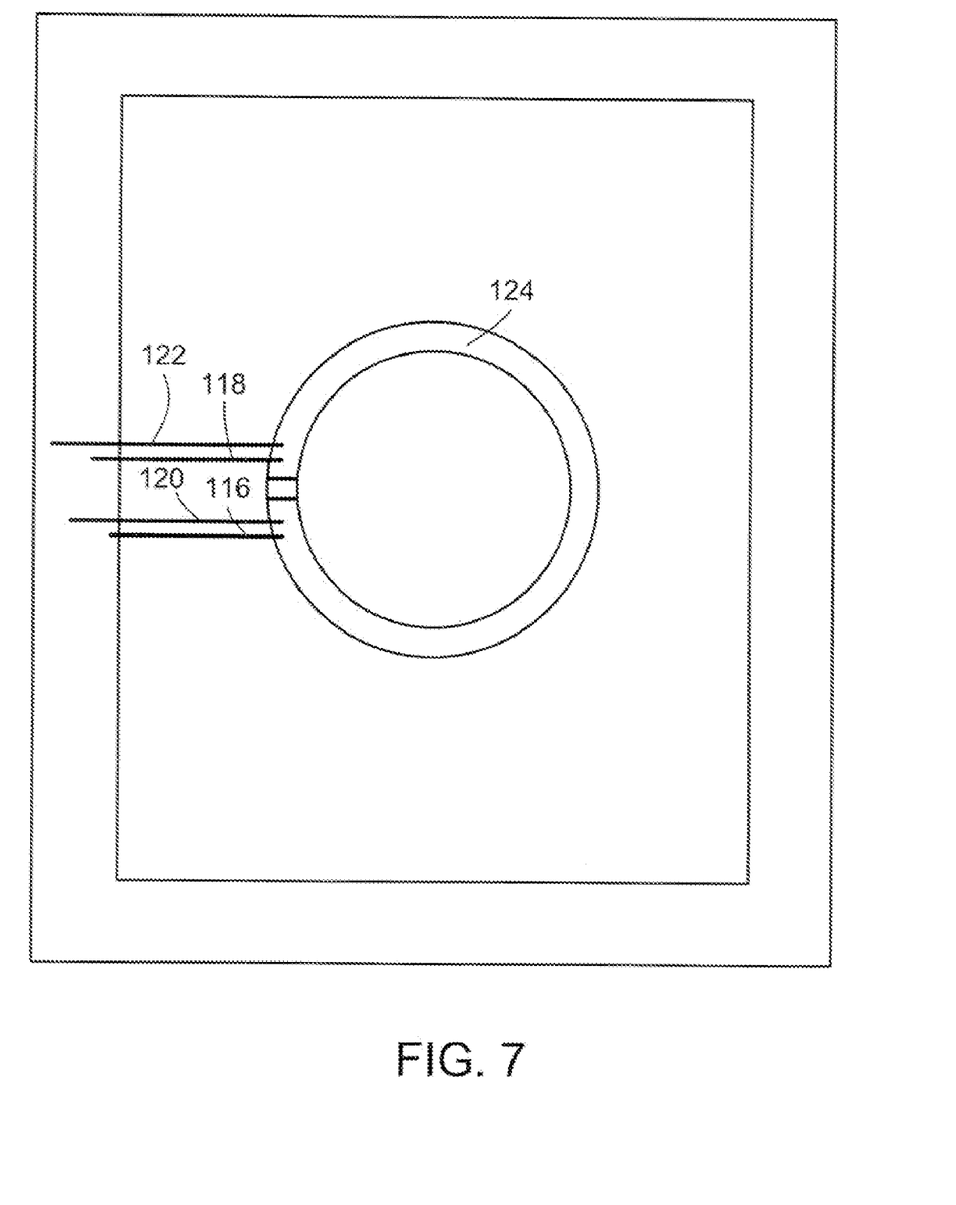
FIG. 7 is a top view of a plasma display.

Referring to FIG. 7, various plasma geometries can be used. One example uses concentric circles 124. The plasma is trapped within a circular annulus that is approximately ¼ side. This arrangement makes the flickering plasma light appear alive. The width of the circular annulus may be sized to the user's desires. The circular annulus does not extend completely around the circle. This forces the low frequency current to travel uniformly from one electrode to the other.

Figure 8:
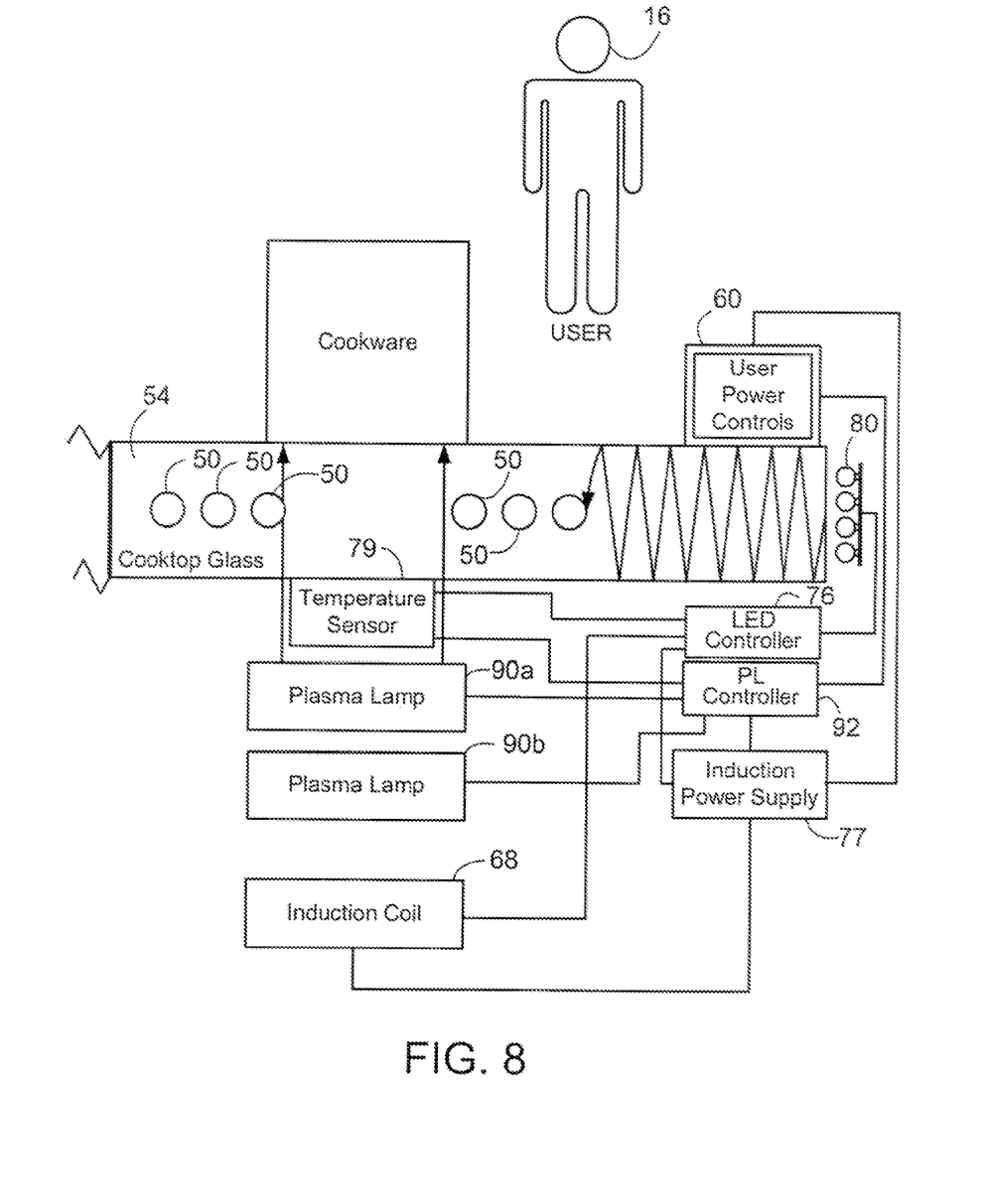

Referring to FIG. 8, the plasma lighting 90a, 90b an be combined with LEDs 80 to produce a variety of effects such as the ability to independently signal when the cooktop 54 is hot (temperature) and when the induction coil 68 is energized (power). For example, red LED's can signal hot cooktop 54 and blue plasma can signal energized induction coil 68. Electrodes or coil pickups can be used to couple the LED with the plasma.

Other embodiments are within the scope of the following claims.

What is claimed is:

1. A method comprising:
   directing light that carries information about cooking in a first direction through a material of which a cooktop having a top surface and a bottom surface is formed towards a redirection element of the cooktop;
   at the redirection element, redirecting the light so that the light is visible above the cooktop; and
   wherein the light reflects off the top surface of the cooktop and off the bottom surface of the cooktop to reach the redirection element.
2. The method of claim 1 wherein the information is represented by a color of the light.
3. The method of claim 1 wherein the information is represented by a pattern, an image, a character, or a symbol.
4. The method of claim 1 wherein the information is modulated by turning the light on and off.
5. The method of claim 1 wherein the material transmits some portion of, or the entire visible spectrum.
6. The method of claim 1 wherein the redirection element comprises a light dispersing element.
7. The method of claim 6 wherein the light dispersing element comprises laser marked features.
8. The method of claim 6 wherein the light dispersing element comprises grit blasted features.
9. The method of claim 1 wherein the first direction comprises a controlled incoming angle at which the light enters the cooktop.
10. The method of claim 1 wherein the information comprises an on-and-off status.
11. The method of claim 1 wherein the information comprises temperature.
12. The method of claim 1 wherein the information comprises a temperature distribution.
13. The method of claim 1 wherein the information comprises a rate of temperature change.
14. The method of claim 1 also comprising delivering the light from a light emitting diode (LED).
15. The method of claim 1 also comprising delivering the light from a plasma lamp.
16. The method of claim 1 wherein the light is viewed as emitting from the vicinity of a heating element.
17. The method of claim 1 wherein the redirection element is in the vicinity of a heating element.
18. The method of claim 17 wherein the vicinity is directly over the heating element.
19. The method of claim 1 wherein the information is represented by light intensity.
20. The method of claim 1 wherein the information comprises a desired temperature.
21. The method of claim 1 wherein the information comprises a presence of food.
22. The method of claim 1 wherein cooktop edges are coated with a Lambertian light reflector.
23. The method of claim 1 wherein at least part of the cooktop bottom surface is coated with an optically absorptive coating.
24. The method of claim 1 wherein the redirection element is located within and/or on the top or bottom surface of the cooktop.
25. The method of claim 1 wherein the information is displayed by one or more internal redirection elements and/or one or more surface redirection elements.
26. The method of claim 16 wherein the heating element comprises an induction coil.
27. The method of claim 17 wherein the heating element comprises an induction coil.
28. The method of claim 18 wherein the heating element comprises an induction coil.
29. A cooktop having a top surface and a bottom surface comprising:
   a material which transmits an entire visible light spectrum or a portion thereof;
   a light redirecting element in the material which redirects light to be visible above the cooktop;

wherein the light redirecting element receives light from a light source located outside the cooktop, the light is directed into an edge of the cooktop, and the light reflects off of the top surface of the cooktop and off of the bottom surface of the cooktop to reach the light redirecting element.

30. The cooktop of claim 29 wherein edges of the cooktop are coated with a Lambertian light reflector.

31. The cooktop of claim 29 wherein at least part of the bottom surface of the cooktop is coated with an optically absorptive coating.

32. An apparatus comprising:
a cooktop having a top surface and a bottom surface;
a plasma lamp to provide light visible at the top surface above the cooktop;
a material from which the cooktop is formed which transmits the light visible at the top surface;
a light redirecting element in the material which redirects light to be visible above the cooktop; and
wherein the light reflects off of the top surface of the cooktop and off of the bottom surface of the cooktop to reach the light redirecting element.

33. The apparatus of claim 32 further comprising an induction heating element.

34. The apparatus of claim 33 wherein the plasma lamp is over the induction heating element.

35. The apparatus of claim 34 wherein the plasma lamp comprises a grounded electrode.

36. The apparatus of claim 32 wherein the plasma lamp comprises a multiplicity of concentric annuli of light emitting zones.

37. The apparatus of claim 36 wherein the light emitting zones of the plasma lamp being illuminated depends on an induction heated cookware's size.

38. The apparatus of claim 32 wherein the light is modulated to display the information.

39. The apparatus of claim 38 wherein light modulation is a variation in color.

40. The apparatus of claim 34 wherein the plasma lamp comprises a multiplicity of phosphor layers with different emitted colors.

41. An method comprising:
determining information about a changing state of cooking being done on a cooktop having a top surface and a bottom surface;
reflecting light that has a characteristic that changes based on the changing state of the cooking, the light being reflected off of the top surface of the cooktop and off of the bottom surface of the cooktop; and
making the light visible above the cooktop.

* * * * *